United States Patent [19]
Lopez

[11] Patent Number: 4,654,975
[45] Date of Patent: Apr. 7, 1987

[54] SIDING GAUGE

[76] Inventor: Joe L. Lopez, 1007 Dallas St., South Houston, Tex. 77587

[21] Appl. No.: 869,280
[22] Filed: Jun. 2, 1986
[51] Int. Cl.[4] .................. G01B 3/30
[52] U.S. Cl. .................. 33/626; 33/646
[58] Field of Search .................. 33/185 R, 187, 188, 33/411

[56] References Cited

U.S. PATENT DOCUMENTS 774,114 11/1904 Spear .................. 33/411
1,031,854 7/1912 Keyes .................. 33/187
1,115,202 10/1914 Ingles .................. 33/187
3,792,852 2/1974 Reniker .................. 33/187

*Primary Examiner*—Richard R. Stearns

[57] ABSTRACT

A siding gauge for carpenters that is designed to hold a nail gun and adjust to permit accurate and fast nailing of different sizes of sidings. Primarily, the gauge consists of a main body having a pair of elevatably adjustable bars that engage with the bottom of one siding and the bottom of another siding that is to be nailed. Openings are also provided in the main body for receiving the head of the gun and the air valve of the gun, in conjunction with a nipple fitting that receives the air line of a compressed air source.

4 Claims, 5 Drawing Figures

FIG. 1
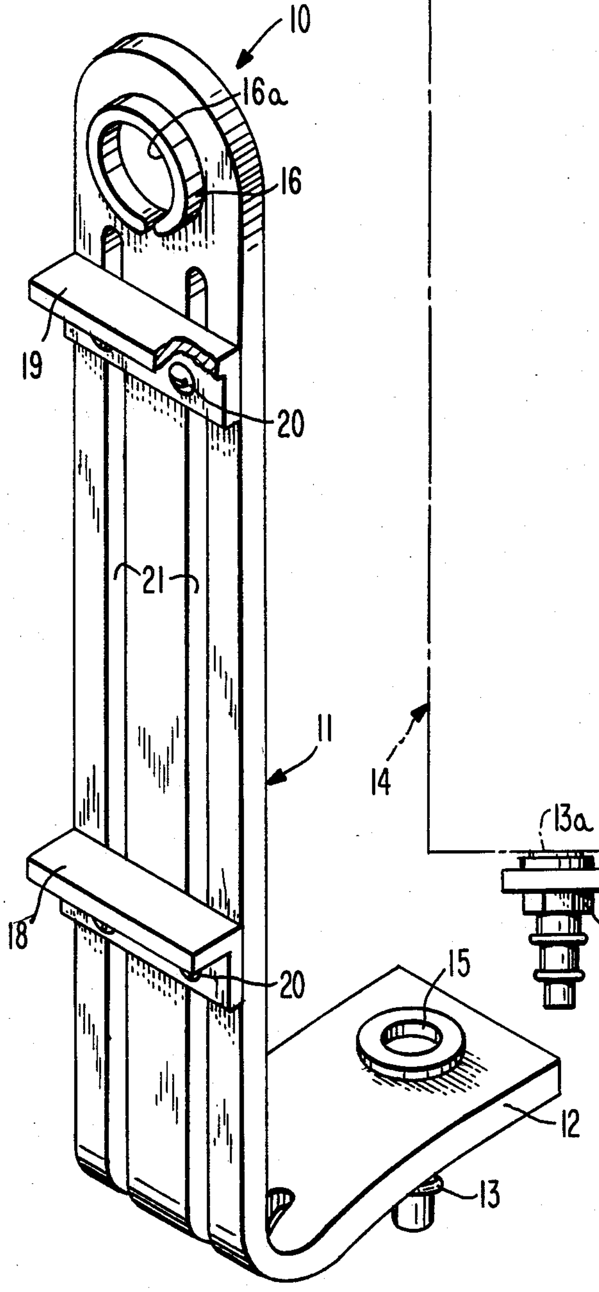
FIG. 2
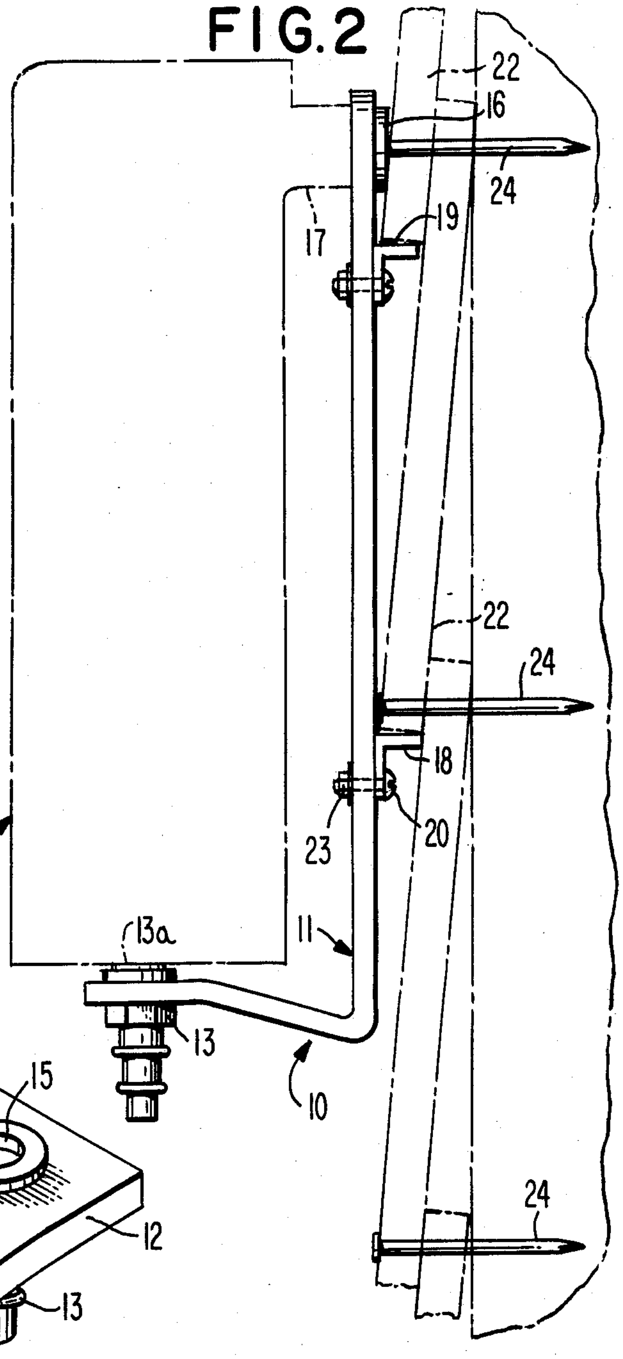
FIG. 3
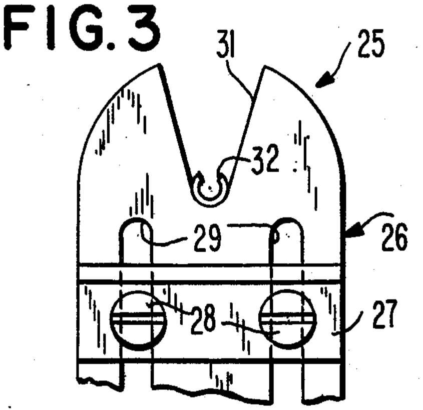
FIG. 4
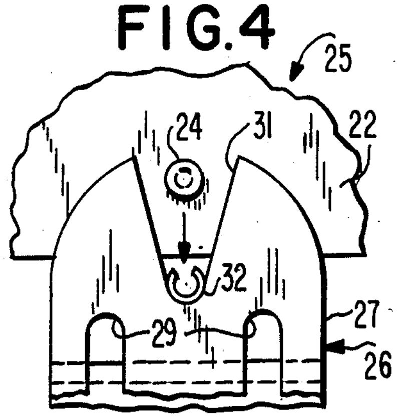
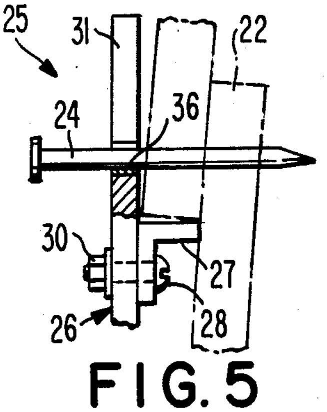
FIG. 5

SIDING GAUGE

BACKGROUND OF THE INVENTION

1. Field of the Invention

This invention relates to tools and instruments, and more particularly, to a siding gauge.

2. Description of Prior Art

References of record are the U.S. Pat. Nos. of Lester Stowell 769,508, George Keys 1,031,854, Edward S. Erickson 2,966,745, and Reniker 3,792,852.

The siding gauge in accordance with the present invention, attaches to a nail gun used by carpenters to nail siding on houses. The siding it is designed for, has no groove and it is difficult to nail, because it just overlaps three-quarters of an inch and the nail will go through both sheets of the siding.

The principal object of this invention is to provide a siding gauge, which will be of such design, as to be employed with a nail gun to nail siding having no groove therein.

Another object of this invention is to provide a siding gauge, which will be of such design, as to have an adjustable upper stop bar and an adjustable lower stop bar, so as to engage with the bottom of a previously nailed siding and the next siding to be nailed, and the main body will be provided with a nipple fitting for receiving the air valve portion of the nail gun.

A further object of this invention is to provide a siding gauge, which when employed, will save the user a substantial amount of time.

BRIEF DESCRIPTION OF THE DRAWINGS

FIG. 1 is a perspective view of the present invention;

FIG. 2, is a side view of the invention, showing a nail gun and siding in phantom lines;

FIG. 3.is a fragmentary rear view of a modified form of the invention, shown in elevation;

FIG. 4 is similar to FIG. 3, but illustrates a nail positioned and started, with the gauge moved downward and out of the grommet nail holder and positioner, and FIG. 5 is a side view of FIGS. 3 and 4, shown partly in section and illustrating a typical nail being held and started through the spring grommet.

SUMMARY OF THE INVENTION

A gauge for being employed by carpenters to nail siding with a nail gun, comprising an adjustable upper stop bar and an adjustable lower stop bar, which are employed to engage with the bottom of previously nailed siding and the next siding to be nailed, and the device supports the nail gun and includes a nipple fitting at its bottom portion for receiving the air valve of the gun that is operated by air under pressure.

DETAILED DESCRIPTION

Accordingly, a gauge 10 is shown to include a flat metal body 11 having a bottom tongue 12 provided with a nipple 13 for receiving the air valve **13*a* of an air operated nail gun 14. The air valve 13*a* is received in an opening 15 provided in tongue 12, and the nipple 13 is received on a hose coupled to an air under pressure source, (not shown). A split collar 16 is provided at an opening 16*a* through the upper end of body 11 and receives the head 17 of nail gun 14. An angle iron lower bar 19 is adjustably received on a face of body 11, and a similar adjustable upper bar 19 is received on the same face of body 11, and a pair of bolt fasteners 20 are received therethrough and are freely received in a pair of elongated slots 21 through body 11, enabling elevation of bars 18 and 19 to engage with sidings 22. Nut fasteners 23 are received on the fasteners 20, for rendering bars 18 and 19 stationary after the elevation has been determined for their engagement with the sidings 22** which are manufactured in different sizes.

In operation, the gun 14 is first placed in the gauge 10 with the head 17 in the collar 16, and the air line is coupled to the nipple 13 that attaches to the air valve **13*a* of the gun 14. The bottom bar 18 is adjusted in elevation to engage with the bottom edge of the siding 22 that has been already nailed by means of nails 24, and the upper bar 19 is similarly adjusted to engage with the bottom of a siding 22 that is to be nailed by means of nails 24**.

Referring now to FIGS. 3, 4, and 5, a modified form of gauge 25 is designed to be employed with a hand held hammer, to effect the same accuracy and speed, as found with the design of 10. The body 26 is provided with adjustable bars 27, which are a pair, and bolt fasteners 28 are received in slots 29 of body 26 and the bars 27, for elevation adjustment thereof. A nut fastener 30 is received on fasteners 28 for the securement of bars 27 stationary in adjustment, and a "V"-shaped cut-out 31 is provided in the top of body 26, for the entrance of nails 24 to be driven by a hammer. A split grommet 32 is also provided in the apex of the opening 31, for holding the nail 24 in place to be driven by the hammer of the carpenter, and the apex portion also provides quick guide means for the placement of the nail.

In use, gauge 24 functions in the same manner, as does gauge 10, with the exception, that the cut-out opening 31 and split grommet 32 provide guide means and holding means for a nail 24.

While various changes may be made in the detail construction, such changes will be within the spirit and scope of the present invention, as defined by the appended claims.

What I now claim is:

1. A siding gauge, comprising a main body having collar means for coupling with a carpenter's nail gun, an upper bar and a lower bar adjustably connected to said gauge, and a nipple fitting secured to said gauge, for receiving the air valve of said nail gun and a compressed air line.

2. A siding gauge as set forth in claim 1, wherein said upper bar and said lower bar are elevatable on said main body and receive bolt fasteners, and an opening in the top of said main body includes a collar that removably receives the head of said nail gun.

3. A siding gauge as set forth in claim 2, wherein said bolt fasteners are freely received in a pair of vertical and elongated slots provided through said main body and receive nut fasteners that secure said bars in a desired adjustment of elevation that causes said lower bar to engage with a longitudinal bottom edge of a siding and said upper bar to engage with a longitudinal edge of a siding to be nailed by means of said gun, and a tongue extends rearward and is integrally attached to said main body and supports the bottom portion of said gun.

4. A siding gauge as set forth in claim 3, wherein said air valve of said gun is removably received in said nipple fitting that is secured in an opening provided through said tongue of said main body, and said nipple extends from the bottom of said tongue and removably receives said compressed air line that is coupled to a compressed air source.

* * * * *